(12) United States Patent
Hong et al.

(10) Patent No.: US 12,289,227 B2
(45) Date of Patent: Apr. 29, 2025

(54) COMPUTING SYSTEM, COMPUTING PROCESSOR AND DATA PROCESSING METHOD

(71) Applicant: Shanghai Biren Technology Co.,Ltd, Shanghai (CN)

(72) Inventors: Zhou Hong, Shanghai (CN); Qin Zheng, Shanghai (CN); ChengPing Luo, Shanghai (CN)

(73) Assignee: Shanghai Biren Technology Co.,Ltd, Shanghai (CN)

( * ) Notice: Subject to any disclaimer, the term of this patent is extended or adjusted under 35 U.S.C. 154(b) by 485 days.

(21) Appl. No.: 17/742,393

(22) Filed: May 11, 2022

(65) Prior Publication Data

US 2022/0368619 A1    Nov. 17, 2022

(30) Foreign Application Priority Data

May 12, 2021    (CN) .......................... 202110514602.9

(51) Int. Cl.
| | |
|---|---|
| *H04L 45/02* | (2022.01) |
| *H04L 45/122* | (2022.01) |
| *H04L 45/24* | (2022.01) |
| *H04L 45/302* | (2022.01) |

(52) U.S. Cl.
CPC ............ *H04L 45/02* (2013.01); *H04L 45/122* (2013.01); *H04L 45/24* (2013.01); *H04L 45/306* (2013.01)

(58) Field of Classification Search
CPC ....... H04L 45/02; H04L 45/122; H04L 45/24; H04L 45/306; G06F 15/17337
See application file for complete search history.

(56) References Cited

U.S. PATENT DOCUMENTS

| | | | | |
|---|---|---|---|---|
| 11,200,096 | B1 * | 12/2021 | Shenbagam | ........ G06F 9/44505 |
| 11,698,878 | B1 * | 7/2023 | Douglis | ................ G06F 13/385 |
| | | | | 710/313 |
| 2010/0042809 | A1 * | 2/2010 | Schenfeld | ......... G06F 15/17343 |
| | | | | 712/E9.016 |
| 2020/0084088 | A1 * | 3/2020 | Zhu | ......................... H04L 43/08 |
| 2021/0368247 | A1 * | 11/2021 | Seyedi | ............... H04Q 11/0066 |

* cited by examiner

*Primary Examiner* — Habte Mered
(74) *Attorney, Agent, or Firm* — JCIP GLOBAL INC.

(57) ABSTRACT

The present disclosure provides a computing system, a computing processor and a data processing method for the computing processor. The computing system includes: multiple computing clusters, each computing cluster includes multiple computing nodes, and each computing node includes multiple computing processors. At least some computing clusters among the computing clusters, at least some computing nodes in each computing cluster and at least some computing processors of each computing node are connected through direct links. Each computing processor of at least some computing processors of the computing node is configured with a local routing table, which is configured for the computing processor to determine, based on the local routing table, the next direct link through which a data packet performs routing from a data source to a data destination, and the computing processor forwards the data packet through the next direct link.

10 Claims, 11 Drawing Sheets

COMPUTING SYSTEM, COMPUTING PROCESSOR AND DATA PROCESSING METHOD

CROSS-REFERENCE TO RELATED APPLICATION

This application claims the priority benefit of China application serial no. 202110514602.9, filed on May 12, 2021. The entirety of the above-mentioned patent application is hereby incorporated by reference herein and made a part of this specification.

BACKGROUND

Field of the Disclosure

The present disclosure generally relates to the field of distributed computing, and more particularly, to a computing system, a computing processor, and a data processing method for the computing processor.

Description of Related Art

A large-scale distributed computing system typically includes multiple layers of computing processors in clusters. FIG. 1 shows an example of such a computing system 1 in the conventional technology. As shown in FIG. 1, the computing system 1 includes a plurality of computing clusters 10, each computing cluster 10 includes a plurality of computing nodes 110, and each computing node 110 includes a plurality of computing processors 120. The multiple computing processors 120 in each computing node 110 may be connected through direct communication links, the multiple computing nodes 110 in each computing cluster 10 may be connected through the network switch 130, and the multiple computing clusters 10 may be connected through the network switch 150. A general-purpose processor 140 is further included in each computing node 110, and a complex communication software runs thereon. When one computing processor 120 in the computing node 110 is to communicate with another computing processor 120 (destination computing processor 120) outside the computing node 110, the general-purpose processor 140 routes the communication request to a network switch 130 connected to the computing node 110 where the destination computing processor 120 is located according to the communication destination, and the communication request is routed by the network switch 130 to the destination computing processor 120. Alternatively, when the destination computing processor 120 is in another computing cluster 10, the network switch 130 further routes the communication request to a network switch 150 connected to another computing cluster 10, and the network switch 150 routes the communication request to the destination computing processor 120. In this case, the network switches 130 and 150 route the communication request to the destination computing processor 120 according to the routing table of the entire computing system 1 maintained therein.

However, due to the processing consumption of the general-purpose processor 140 and the communication consumption between the general-purpose processor 140 and the network switch 130 and between the network switch 130 and the network switch 150, the entire communication process will inevitably cause a large system latency, thereby affecting system performance. Also, due to the use of general-purpose processor 140 and dedicated network switches 130 and 150, the overall complexity and cost of computing system 1 will be significantly increased.

In some applications, the processing capability required by the application may be centralized and provided by one computing cluster 10 or one or more computing nodes 110 in a computing cluster 10 through the upper layer of resource scheduling, thereby reducing the communication consumption between the computing nodes 110 and the computing clusters 10. However, in applications which require processing of large amounts of data, such as many applications in the field of artificial intelligence, the required computing capability usually involves scheduling of multiple computing clusters 10 to operate collaboratively. In this case, the topology of the computing system 1 shown in FIG. 1 inevitably causes high latency and low performance.

SUMMARY OF THE DISCLOSURE

To address the above issue, the present disclosure provides a unified and directly connected computing system. In addition to the direct links between computing processors, connections are also made through direct links between at least some computing nodes and between at least some computing clusters. Moreover, a simple small local routing table is configured in each computing processor with a direct link, so that the computing processor can be directly connected at all hierarchical levels of the computing system. Furthermore, other than data processing, each computing processor may further participate in data transfer by controlling the flow of data based on the type of application.

In an aspect of the present disclosure, a computing system is provided. The computing system includes: a plurality of computing clusters, each computing cluster includes a plurality of computing nodes, and each computing node includes a plurality of computing processors. At least some of the plurality of computing clusters, at least some computing nodes of each computing cluster and at least some computing processors of each computing node are connected through direct links. Each computing processor of at least some computing processors of the computing nodes is configured with a local routing table for the computing processor to determine, based on the local routing table, a next direct link through which a data packet performs routing from a data source to a data destination, and the computing processor forwards the data packet through the next direct link.

The data source includes the computing processor itself, another computing processor in the local computing node where the computing processor is located, or an external computing node of the local computing node. The data destination includes the computing processor itself, another computing processor in the local computing node, or external computing node of the local computing node.

In some embodiments, the computing processor is configured to perform the following: receiving the data packet; determining whether the data destination of the data packet is the computing processor in a local computing node where the computing processor is located or the computing processor in an external computing node. If it is determined that the data destination of the data packet is the computing processor in the local computing node, it is determined whether the data destination of the data packet is the computing processor itself or another computing processor in the local computing node. If it is determined that the data destination of the data packet is another computing processor in the local computing node, the next direct link of the data packet is determined, based on the local routing table, to be an internal direct link from the computing processor to another computing processor. If it is determined that the data destination of the data packet is a computing processor in the external computing node, it is determined that the next direct link of the data packet is an outgoing direct link of the computing processor. If it is determined that the data destination of the data packet is the computing processor itself, the data packet is directly subjected to local processing.

In some embodiments, the computing processor is configured to perform the following: receiving the data packet; determining whether the data source of the data packet is another computing processor of the at least some computing processors or a computing processor in an external computing node. If it is determined that the data source of the data packet is a computing processor in the external computing node, it is determined whether the data packet specifies the data destination or a relay computing processor in the local computing node. If it is determined that the data packet specifies the data destination or the relay computing processor in the computing node, the next direct link of the data packet is determined to be a direct link between the computing processor and the data destination or the relay computing processor. If it is determined that the data packet does not specify the data destination or the relay computing processor in the local computing node, a next direct link of the data packet is determined based on the application program executed by the computing processor. If it is determined that the data source of the data packet is another computing processor of the at least some computing processors, the next direct link of the data packet is determined, based on the local routing table, to be an outgoing direct link or an internal direct link.

In some embodiments, the computing system has a fully connected structure, and any two computing clusters in the plurality of computing clusters, any two computing nodes in each computing cluster, and any two computing processors in each computing node are connected through a direct link. Each computing processor is connected to a computing processor in another computing node in the same computing cluster or a different computing cluster through an outgoing direct link.

In some embodiments, the computing system further includes: a routing compiler, which is configured to compile and generate the local routing table for the computing processor according to the connection relationship and application requirements of the direct link of each computing processor in the computing system.

In another aspect of the present disclosure, a computing processor is provided, which is connected to at least one another computing processor in a local computing node through a direct link, and the computing processor is configured with a local routing table. The computing processor is configured to determine, based on the local routing table, a next direct link through which the data packet performs routing from a data source to a data destination, and the computing processor forwards the data packet through the next direct link.

In some embodiments, the data source includes the computing processor itself, another computing processor in the local computing node, or an external computing node of the local computing node, and the data destination includes the computing processor itself, another computing processor in the local computing node, or the external computing node of the local computing node.

In some embodiments, the computing processor is configured to perform the following: receiving the data packet; determining whether the data destination of the data packet is the computing processor in the local computing node or the computing processor in an external computing node. If it is determined that the data destination of the data packet is the computing processor in the local computing node, it is determined whether the data destination of the data packet is the computing processor itself or another computing processor in the local computing node. If it is determined that the data destination of the data packet is another computing processor in the local computing node, the next direct link of the data packet is determined, based on the local routing table, to be an internal direct link from the computing processor to the at least one another computing processor. If it is determined that the data destination of the data packet is a computing processor in the external computing node, it is determined that the next direct link of the data packet is an outgoing direct link of the computing processor. If it is determined that the data destination of the data packet is the computing processor itself, the data packet is directly subjected to local processing.

In some embodiments, the computing processor is configured to perform the following: receiving the data packet; determining whether the data source of the data packet is the at least one another computing processor or a computing processor in an external computing node. If it is determined that the data source of the data packet is a computing processor in the external computing node, it is determined whether the data packet specifies a data destination or a relay computing processor in the local computing node. If it is determined that the data packet specifies the data destination or the relay computing processor in the local computing node, the next direct link of the data packet is determined to be a direct link between the computing processor and the data destination or the relay computing processor. If it is determined that the data packet does not specify the data destination or the relay computing processor in the local computing node, a next direct link of the data packet is determined based on the application program executed by the computing processor. If it is determined that the data source of the data packet is the at least one another computing processor, the next direct link of the data packet is determined, based on the local routing table, to be an outgoing direct link or an internal direct link.

In another aspect of the present disclosure, a data processing method for a computing processor is provided, and the computing processor is connected to at least one another computing processor in the local computing node through the direct link and is configured with a local routing table. The method includes: receiving a data packet; determining whether the data destination of the data packet is a computing processor in the local computing node or a computing processor in an external computing node. If it is determined that the data destination of the data packet is the computing processor in the local computing node, it is determined whether the data destination of the data packet is the computing processor itself or another computing processor in the local computing node. If it is determined that the data destination of the data packet is another computing processor in the local computing node, the next direct link of the data packet is determined, based on the local routing table, to be an internal direct link from the computing processor to the at least one another computing processor. If it is determined that the data destination of the data packet is a computing processor in the external computing node, it is determined that the next direct link of the data packet is an outgoing direct link of the computing processor. The data packet is forwarded through the next direct link. If it is determined that the data destination of the data packet is the computing processor itself, the data packet is directly subjected to local processing.

In yet another aspect of the present disclosure, a data processing method for a computing processor is provided. The computing processor is connected with at least one another computing processor in a local computing node through a direct link and is configured with a local routing table. The method includes: receiving a data packet; determining whether the data source of the data packet is the at least one another computing processor or a computing processor in an external computing node. If it is determined that the data source of the data packet is a computing processor in the external computing node, it is determined whether the data packet specifies a data destination or a relay computing processor in the local computing node. If it is determined that the data packet specifies the data destination or the relay computing processor in the local computing node, the next direct link of the data packet is determined to be the direct link between the computing processor and the data destination or the relay computing processor. If it is determined that the data packet does not specify the data destination or the relay computing processor in the local computing node, the next direct link of the data packet is determined based on the application program executed by the computing processor. If it is determined that the data source of the data packet is the at least one another computing processor, the next direct link of the data packet is determined, based on the local routing table, to be the outgoing direct link or the internal direct link. The data packet is forwarded through the next direct link.

BRIEF DESCRIPTION OF THE DRAWINGS

The description of specific embodiments of the present disclosure given below with reference to the accompanying drawings serves to better illustrate the present disclosure and make other objects, details, features and advantages of the present disclosure become clearer.

DESCRIPTION OF EMBODIMENTS

Figure 1:
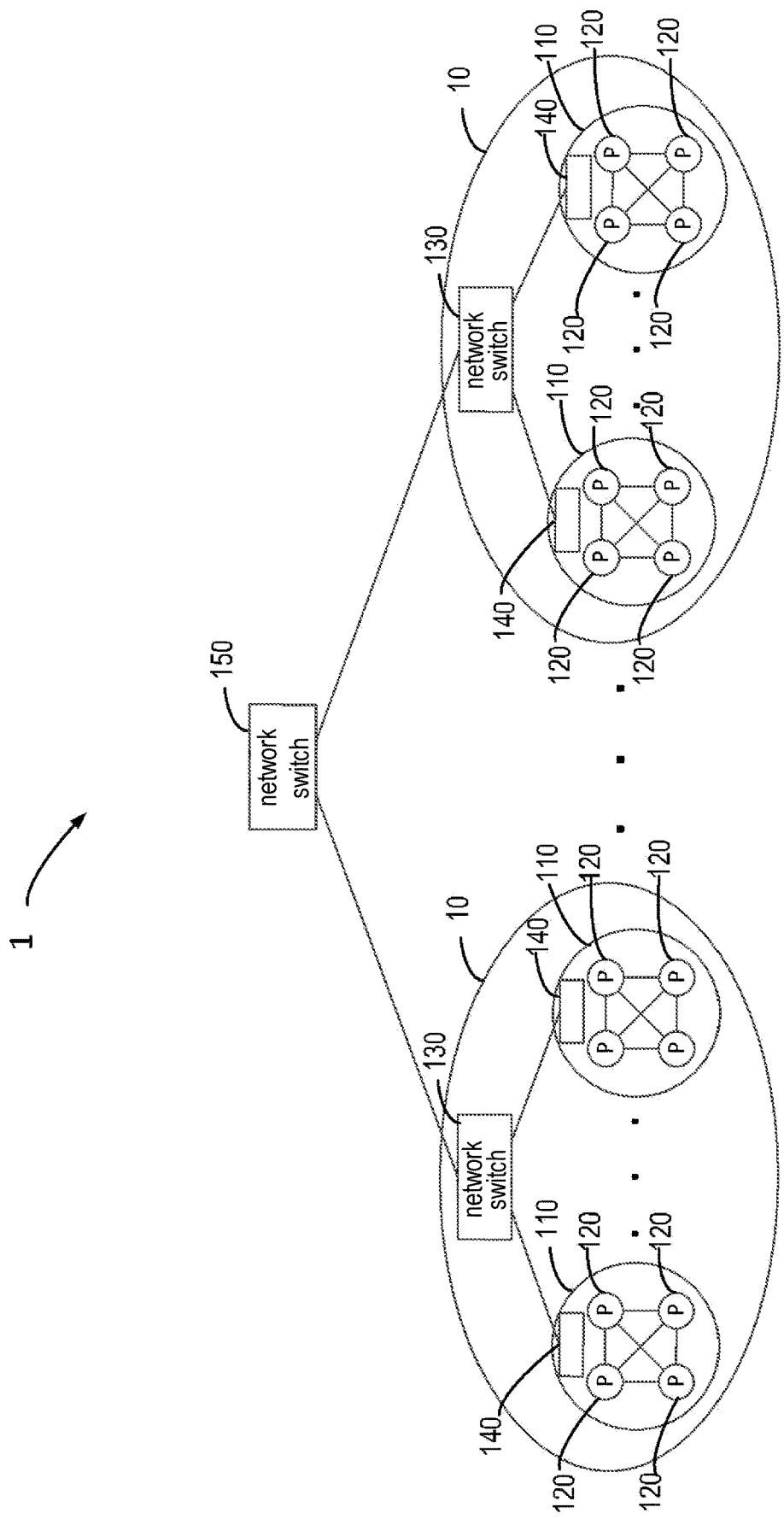
FIG. 1 is an example of such a computing system in the conventional technology.

Preferred embodiments of the present disclosure will be described in more detail below with reference to the accompanying drawings. While preferred embodiments of the present disclosure are shown in the drawings, it should be understood that the present disclosure may be embodied in various forms and should not be limited by the embodiments set forth herein. Rather, these embodiments are provided so that this disclosure will be thorough and complete, and will fully convey the scope of the disclosure to those skilled in the art.

The term "including" and its variations as used herein means open-ended inclusion, i.e., "including but not limited to". The term "or" means "and/or" unless specifically stated otherwise. The term "based on" means "at least partially based on". The terms "one embodiment" and "some embodiments" mean "at least one exemplary embodiment." The term "another embodiment" means "at least another embodiment." The terms "first", "second", etc. may refer to different or the same objects.

Figure 2:
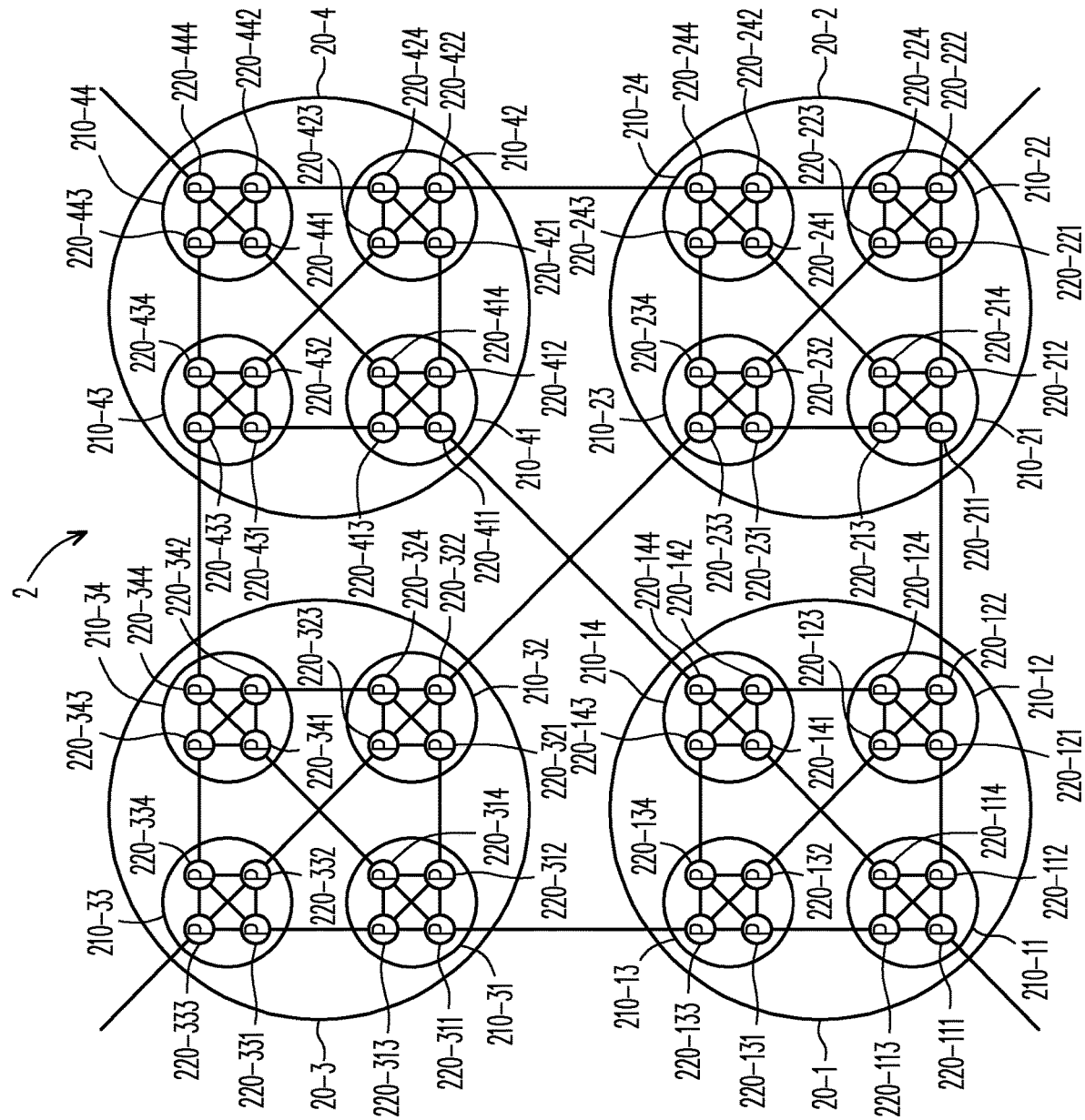
FIG. 2 is a schematic view of a computing system according to an embodiment of the present disclosure.

FIG. 2 is a schematic view of a computing system 2 according to an embodiment of the present disclosure.

As shown in FIG. 2, the computing system 2 includes a plurality of computing clusters 20-$i$ (where i indicates the number of each computing cluster, i=1, 2, 3, 4 in FIG. 2, and the computing clusters 20-$i$ are collectively referred to as computing clusters 20).

Each computing cluster 20 includes a plurality of computing nodes 210-$ij$ (i indicates the number of the computing cluster, j indicates the number of each computing node in a computing cluster 20, i, j=1, 2, 3, 4 in FIG. 2, the computing nodes 210-$ij$ are also collectively referred to as computing nodes 210 hereinafter). For example, the computing cluster 20-1 includes a plurality of computing nodes 210-11, 210-12, 210-13 and 210-14, the computing cluster 20-2 includes a plurality of computing nodes 210-21, 210-22, 210-23 and 210-24, the computing cluster 20-3 includes a plurality of computing nodes 210-31, 210-32, 210-33 and 210-34, and the computing cluster 20-4 includes a plurality of computing nodes 210-41, 210-42, 210-43 and 210-44.

Each computing node 210 includes a plurality of computing processors 220-$ijk$ (i indicates the number of the computing cluster, j indicates the number of each computing node 210 in a computing cluster 20, and k indicates the number of each computing processor in a computing node 21, i, j, k=1, 2, 3, 4 in FIG. 2, the computing processors 220-$ijk$ are also collectively referred to as computing processor 220 hereinafter). For example, the computing node 210-11 in the computing cluster 20-1 includes multiple computing processors 220-111, 220-112, 220-113, and 220-114, and the computing node 210-12 in the computing cluster 20-1 includes multiple computing processors 220-121, 220-122, 220-123, and 220-124, . . . computing node 210-44 in the computing cluster 20-4 includes a plurality of computing processors 220-441, 220-442, 220-443 and 220-444.

Different from the computing system 1 shown in FIG. 1, in the computing system 2 shown in FIG. 2, not only that the computing processors 220 in each computing node 210 are connected through a direct link, the computing clusters 20 and the respective computing nodes 210 of each computing cluster 20 are also connected through direct links without using the network switches 130 and 150 as shown in FIG. 1. Here, the direct link between the computing processors 220 may be implemented using various existing or future developed fast point-to-point links, such as a PCI-E (peripheral component interconnect express) bus or the like.

In the computing system 2 shown in FIG. 2, since a plurality of computing clusters 20 are interconnected in pairs, a plurality of computing nodes 210 in each computing cluster 20 are interconnected in pairs, and a plurality of computing processors 220 in each computing node 210 are interconnected in pairs, the computing system 2 shown in FIG. 2 has a fully connected structure, which is also referred to as a fully connected network. In such a fully connected network, each computing processor 220 is connected to a computing processor 220 in another computing node 210 in the same computing cluster 20 or in a different computing cluster 20 through an outgoing direct link.

Since each computing cluster 20 and each computing node 210 of each computing cluster 20 are connected through direct links, the general-purpose processor 140 shown in FIG. 1 is no longer required in each computing node 210.

As a substitute of the general-purpose processor 140 and network switches 130 and 150 in the computing system 1 shown in FIG. 1, in the computing system 2 shown in FIG. 2, each computing processor 220 with a direct link may maintain a software-configurable local routing table so as to control the transmission of data traffic. Specifically, the local routing table is used to indicate, at the computing processor 220, the next direct link through which a data packet performs routing from the data source to the data destination. The data source refers to the previous-hop computing processor 220 of the data packet, which may be the computing processor 220 itself (that is, the data is generated by the computing processor itself), another computing processor 220 within the computing node 210 (also referred to as local computing node) where the computing processor 220 is located, or may be a computing processor 220 in other computing nodes 210 (also referred to as external computing nodes) outside the computing node 210 where the computing processor 220 is located. The data source may be determined through the direct link from which the data packet is received. The data destination refers to the final computing processor 220 indicated to be delivered in the data packet, which may be the computing processor 220 itself, another computing processor 220 in the computing node 210 (also referred to as the local computing node) where the computing processor 220 is located, or a computing processor 220 in other computing nodes 210 (also referred to as external computing nodes) outside the computing node 210 where the computing processor 220 is located. The external computing nodes may be other computing nodes 210 in the same computing cluster 20, or may be other computing nodes 210 in other computing clusters 20. Data processing at computing processor 220 is further described below in conjunction with FIG. 3.

Figure 3:
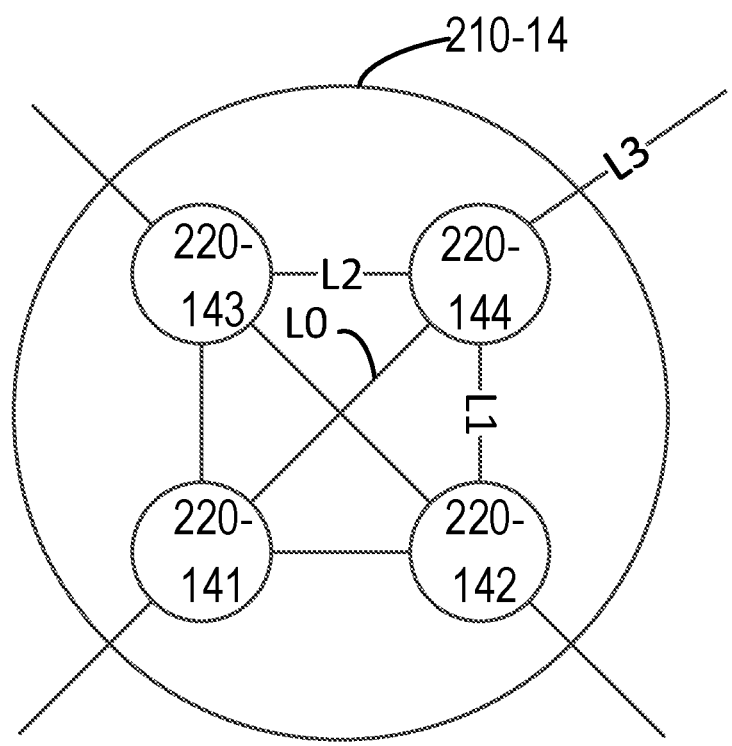
FIG. 3 is a diagram showing connection of a computing processor in a computing node shown in FIG. 2.

FIG. 3 is a diagram showing connection of a computing processor 220 in a computing node 210 shown in FIG. 2. Table 1 below shows an exemplary local routing table of the computing processor 220. The local routing table of the computing processor 220 may be generated by an upper-layer routing compiler (not shown in the figure) according to the connection relationship of the direct link of the computing processor 220 in the computing system 2 and the application requirements to be executed. Certainly, in some cases, the local routing table may also be manually generated according to the connection relationship of the direct link of the computing processor 220 and application requirements.

It is assumed that the computing node 210 is the computing node 210-14 shown in FIG. 2, and the computing processor 220 is the computing processor 220-144 in the computing node 210-14. As shown in FIG. 3, the computing processor 220-144 is connected to other computing processors 220-141, 220-142, and 220-143 in the local computing node 210-14 through direct links L0, L1, and L2, respectively, and is connected to an external node 210 (a computing node 210-41 in another computing cluster 20-4 as shown in FIG. 2) through the direct link L3, and more specifically, connected to a computing processor 220 (the computing processor 220-411 in the computing node 210-41 in the computing cluster 20-4 shown in FIG. 2) in the external node 210. Here, the direct links (such as L0, L1, and L2) connected to the computing processor 220 in the local computing node 210 are also referred to as internal direct links, and the direct links (such as L3) connected to the external computing node 210 are also referred to as outgoing direct links.

TABLE 1

Local routing table of computing processor 220-144

| Data destination | Data source | | | | |
|---|---|---|---|---|---|
| | computing processor 220-141 | computing processor 220-142 | computing processor 220-143 | computing processor 220-144 | External node |
| computing processor 220-141 | | L0 | L0 | L0 | L0/local |
| computing processor 220-142 | L1 | | L1 | L1 | L1/local |
| computing processor 220-143 | L2 | L2 | | L2 | L2/local |
| computing processor 220-144 | local | local | local | | local |
| External node | L3 | L3 | L3 | L3 | local |

Figure 4:
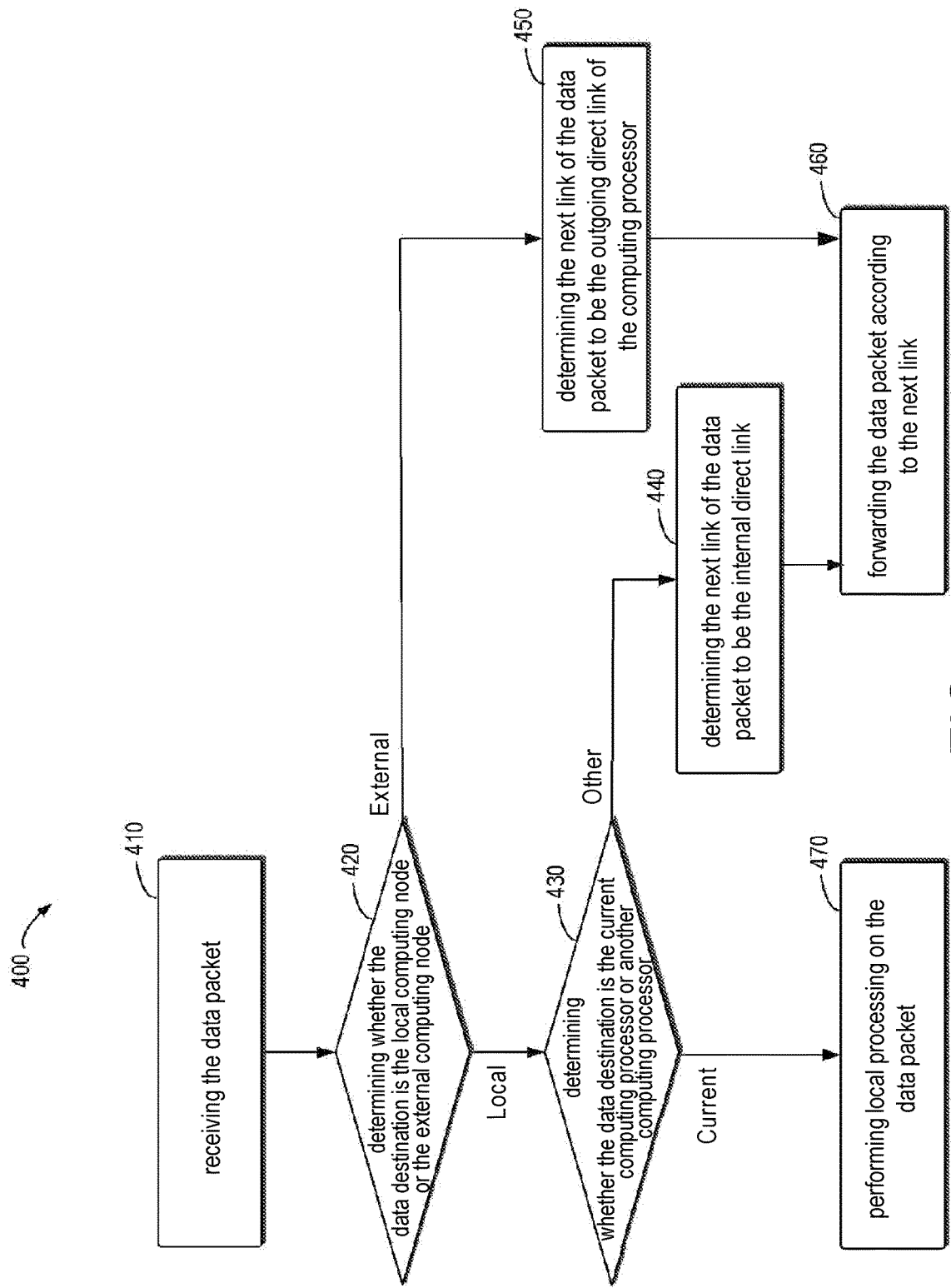
FIG. 4 is a flowchart of a data processing process performed in a computing processor according to an embodiment of the present disclosure.

According to the local routing table as shown in Table 1, the computing processor 220-144 may process the received data packets differently. FIG. 4 is a flowchart of a data processing process 400 performed in a computing processor 220 according to an embodiment of the present disclosure. In the embodiment shown in FIG. 4, the computing processor 220 does not take into account whether the data source of the data packet is another computing processor 220 within the local computing node 210 or the computing processor 220 of the external computing node 210.

As shown in FIG. 4, in step 410, the computing processor 220-144 receives a data packet including a data source and a data destination.

In step 420, the computing processor 220-144 may determine whether the data destination of the data packet is the computing processor 220 within the local computing node 210-14 or the computing processor 220 within the external computing node 210. The external computing node 210 may be other computing nodes 210-11, 210-12 or 210-13 in the same computing cluster 20-1, or may be computing node 210 in other computing clusters 20-2, 20-3 or 20-4.

If it is determined in step 420 that the data destination of the data packet is the computing processor 220 in the local computing node 210, then in step 430, the computing processor 220-144 may further determine whether the data destination of the data packet is the local computing processor (i.e., the current computing processor 220-144 itself) or another computing processor 220 (e.g., computing processor 220-141, 220-142, or 220-143) within the local computing node 210-14.

If it is determined in step 430 that the data destination of the data packet is another computing processor 220 (e.g., computing processor 220-141, 220-142 or 220-143) within the local computing node 210-14, then in step 440, the computing processor 220-144 may determine the next direct link of the data packet as the internal direct link L0, L1 or L2 based on the local routing table. As shown in Table 1, when the data destination is computing processor 220-141, the next direct link is the internal direct link L0 between the computing processor 220-144 and the computing processor 220-141. When the data destination is the computing processor 220-142, the next direct link is the internal direct link L1 between the computing processor 220-144 and the computing processor 220-142. When the data destination is the computing processor 220-143, the next direct link is the internal direct link L2 between the computing processor 220-144 and the computing processor 220-143.

If in step 420 it is determined that the data destination of the data packet is the computing processor 220 in the external computing node 210, then in step 450, the computing processor 220-144 may determine that the next direct link of the data packet is the outgoing direct link L3 of the computing processor 220-144. As mentioned above, the external computing node 210 may be other computing nodes 210 in the same computing cluster 20, or may be other computing nodes 210 in other computing clusters 20.

In step 460, the computing processor 220-144 may forward the data packet according to the next direct link determined in step 440 or 450.

On the other hand, if it is determined in step 430 that the data destination of the data packet is the current local computing processor 220-144, then in step 470, the computing processor 220-144 may directly perform local processing on the data packet. Further, the computing processor 220-144 may further determine whether the result of the local processing is the final result or needs to be forwarded to other computing processors for further processing (not shown in the figure) according to the application program executed by the computing processor 220-144.

Figure 5:
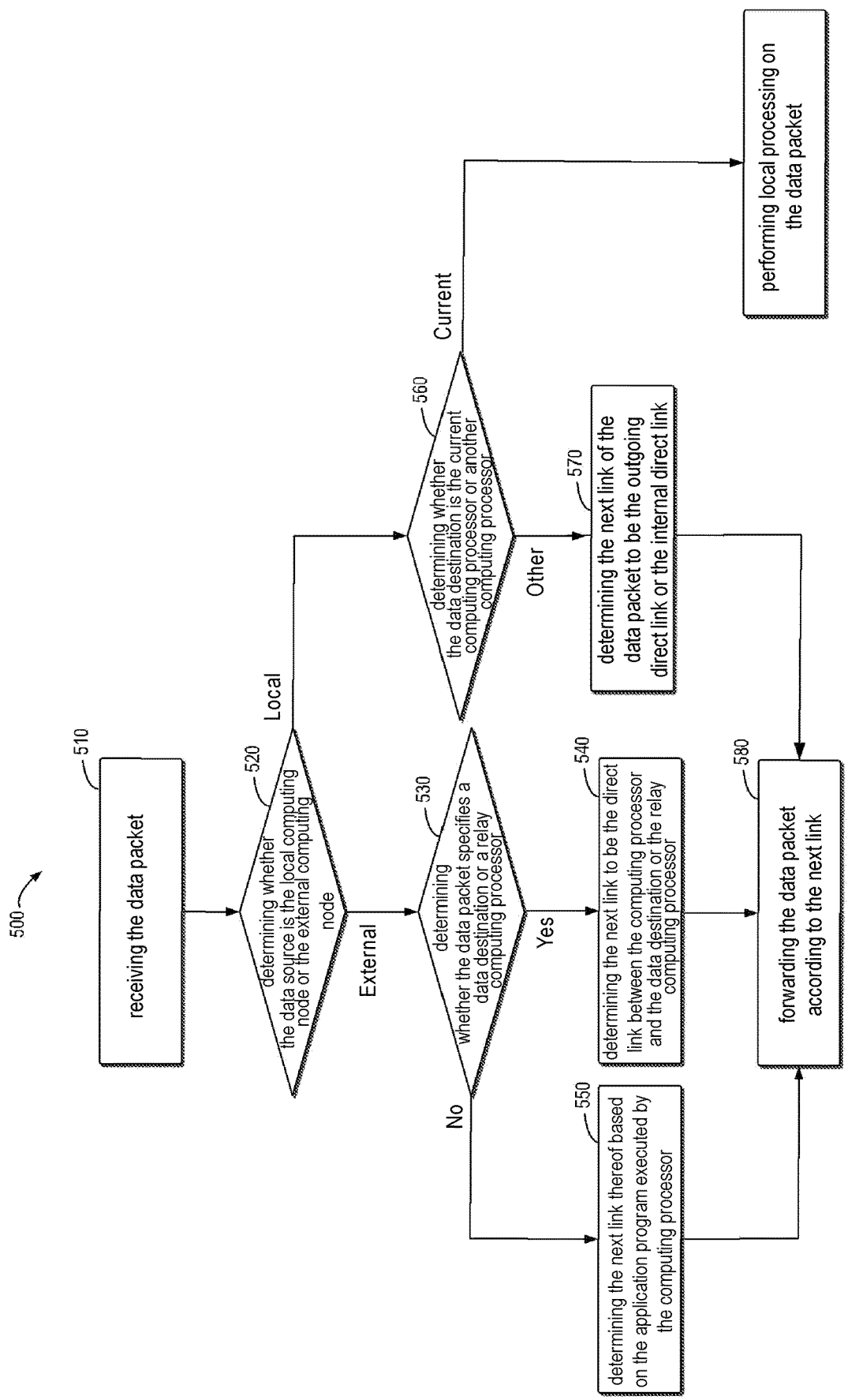
FIG. 5 is a flowchart of a data processing process performed in a computing processor according to another embodiment of the present disclosure.

FIG. 5 is a flowchart of a data processing process 500 performed in a computing processor 220 according to another embodiment of the present disclosure. In the embodiment shown in FIG. 5, when the data source of the data packet is an external computing node, the computing processor 220 may route the data packet according to whether the data destination in the data packet is specified.

As shown in FIG. 5, in step 510, the computing processor 220-144 receives a data packet that includes a data source.

In step 520, the computing processor 220-144 may determine whether the data source of the data packet is the computing processor 220 within the local computing node 210-14 or the computing processor 220 within the external computing node 210. As mentioned above, the external computing node 210 may be other computing nodes 210-11, 210-12 or 210-13 in the same computing cluster 20-1, or may be other computing nodes 210 in other computing clusters 20-2, 20-3 or 20-4.

If it is determined in step 520 that the data source of the data packet is the computing processor 220 in the external computing node 210, then in step 530, the computing processor 220-144 may determine whether the data packet specifies a data destination or a relay computing processor 220 (e.g., computing processor 220-141, 220-142, or 220-143) in the local computing node 210-14. That is, the data packet might specify the next-hop computing processor 220 as the data destination or relay processor. In this case, the computing processor 220-144 should perform routing based on the next-hop computing processor 220 specified in the data packet.

If it is determined in step 530 that the data packet specifies a data destination or a relay computing processor 220-141, 220-142, or 220-143 in the local computing node 210-14 (determining result is "Yes" in step 530), then in step 540, the computing processor 220-144 may determine the next direct link of the data packet to be the direct link between the computing processor 220-144 and the data destination or the relay computing processor 220 (outgoing direct link L3 or internal direct link L0, L1 or L2). For example, if the data packet specifies that the local computing node 210-14 is to pass through the computing processor 220-141, the computing processor 220-144 may determine the next direct link to be the internal direct link L0 between the computing processor 220-144 and the computing processor 220-141. Assuming that the data packet specifies that the local computing node 210-14 is to pass through the computing processor 220-142, the computing processor 220-144 may determine the next direct link to be the internal direct link L1 between the computing processor 220-144 and the computing processor 220-142. Assuming that the data packet specifies that the local computing node 210-14 is to pass through the computing processor 220-143, the computing processor 220-144 may determine the next direct link to be the internal direct link L2 between the computing processor 220-144 and the computing processor 220-143. Assuming the data packet specifies the data destination in the external computing node 210, the computing processor 220-144 may determine the next direct link to be the outgoing direct link L3.

On the other hand, if it is determined in step 530 that the data packet does not specify the final data destination (e.g., only the destination node instead of the destination processor is specified) or the relay computing processor 220 in the local computing node 210 (determining result is "No" in step 530), then in step 550, the computing processor 220-144 may determine the next direct link thereof based on the application program executed by the computing processor 220-144. For example, the computing processor 220-144 itself may be programmed to be capable of processing such computing processor of which the destination is not specified or the packet of locally passed computing processor, which may, for example, determine a different next direct link according to the application program being executed by the processor, so as to achieve the purpose of allowing the application program itself to involve in data routing.

If it is determined in step 520 that the data source of the data packet is the computing processor 220 within the local computing node 210-14, then in step 560, the computing processor 220-144 may further determine whether the data destination of the data packet is the local computing processor (i.e., the current computing processor 220-144 itself) or another computing processor 220 (e.g., computing processor 220-141, 220-142, or 220-143) within the local computing node 210-14.

If it is determined in step 560 that the data destination of the data packet is another computing processor 220 (e.g., computing processor 220-141, 220-142, or 220-143) within the local computing node 210-14, then in step 570, the computing processor 220-144 may determine the next direct link of the data packet to be the outgoing direct link L3 or the internal direct link L0, L1 or L2 based on the local routing table.

Next, in step 580, the computing processor 220-144 may forward the data packet according to the next direct link determined in step 540, 550 or 570.

On the other hand, if it is determined in step 560 that the data destination of the data packet is the current local computing processor 220-144, then in step 590, the computing processor 220-144 may directly perform local processing on the data packet. Moreover, the computing processor 220-144 may further determine whether the result of the local processing is the final result or needs to be forwarded to other computing processors for further processing (not shown in the figure) according to the application program executed by the computing processor 220-144.

In this way, the computing processor 220 is able to be involved in data routing, which helps reduce the size of hardware routing table (i.e., the routing table does not need to store routing information for all destinations in the entire system, only the local routing table of each computing processor 220 is required to store the routing information required for local routing), on the other hand, which helps to reduce the destination information that the data packet needs to carry (that is, the data packet does not need to specify the complete path of the final destination in its packet header, and it is only required to specify the next-hop path or specify the final destination), while allowing routing of data to be performed very flexibly and dynamically (e.g., data may be routed differently for different applications).

The embodiment of the present disclosure has been described above by taking the computing system 2 of the fully connected network shown in FIG. 2 as an example, but those skilled in the art can understand that the idea of the present disclosure can be applied to computing systems with any topology and scale. For example, the computing system 2 may include any number of computing clusters 20, each computing cluster 20 may include any number of computing nodes 210, and each computing node 210 may include any number of computing processor 220. These computing clusters 20, the computing nodes 210 in a computing cluster 20 and the computing processors 220 in a computing node 210 may be connected through any topology (such as a fully connected structure or a partially connected structure).

Figure 6:
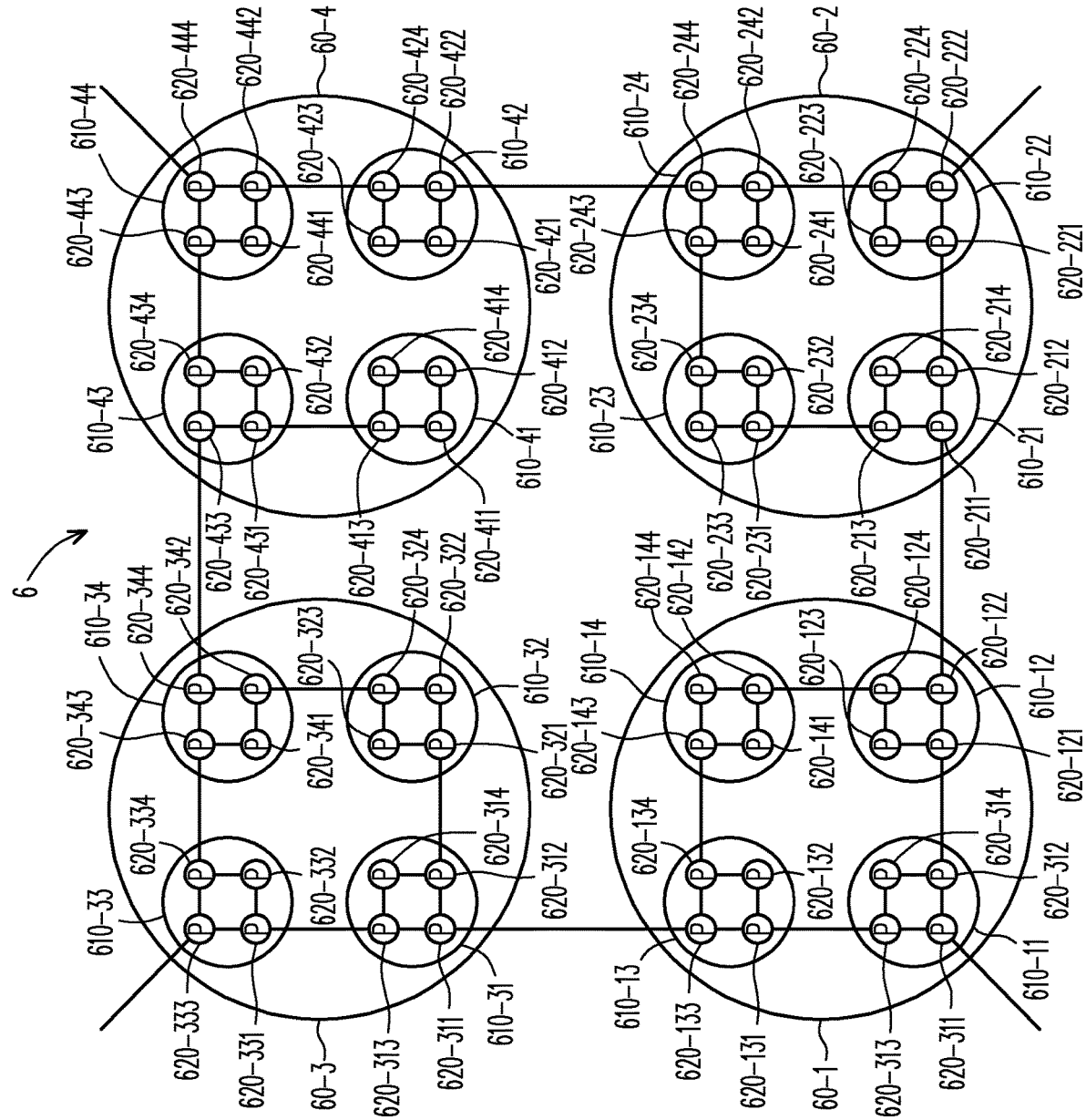
FIG. 6 is a schematic view of a computing system according to still another embodiment of the present disclosure.

FIG. 6 is a schematic view of a computing system 6 according to still another embodiment of the present disclosure. The respective computing clusters, computing nodes, and computing processors are labeled in a manner similar to that shown in FIG. 2, and related description is not repeated herein.

Compared with the computing system 2 shown in FIG. 2, the computing system 6 shown in FIG. 6 uses a partially connected structure with fewer direct links. For example, there is no direct link between a computing cluster 60-1 and a computing cluster 60-4, and there is no direct link between a computing cluster 60-2 and a computing cluster 60-3. Furthermore, in each computing cluster 60-*i*, there is no direct link between computing nodes 610-*i*1 and 610-*i*4, and there is no direct link between computing nodes 610-*i*2 and 610-*i*3. Additionally, in each computing node 610-*ij*, there is no direct link between computing processors 620-*ij*1 and 620-*ij*4, and there is no direct link between computing processors 620-*ij*2 and 620-*ij*3.

That is to say, in the computing system 6 shown in FIG. 6, only some computing clusters 60 among the multiple computing clusters 60 have direct links between them, only some computing nodes 610 in each computing cluster 60 have direct links between them, and only some computing processors 620 in each computing node 610 have direct links between them. Unlike the computing system 2 shown in FIG. 2, in such a partially connected structure, one computing processor 620 may have an outgoing direct link connected to a computing processor 620 in another computing node 610 in the same computing cluster 60 or in a different computing cluster 60, such as the computing processor 620-111 (connected with a computing processor 620 in a different computing cluster 60), the computing processor 620-112 (connected with the computing processor 620-121 in another computing node 610-12 in the same computing cluster 60-1) and the computing processor 620-113 (connected with a computing processor 620-131 in another computing node 610-13 in the same computing cluster 60-1) in the computing node 610-11 in the computing cluster 60-1, etc., and may not have an outgoing direct link connected to a computing processor 620 in another computing node 610 in the same computing cluster 60 or in a different computing cluster 60, such as the computing processor 620-114 in the computing node 610-11 in the computing cluster 60-1.

Note that FIG. 6 only shows a specific form of the partially connected structure, and the partially connected structure may further have many different forms. For example, in the computing system 6 of FIG. 6, several direct links may be added or removed between different computing clusters 60, between different computing nodes 610, and/or between different computing processors 620.

Similar to the computing system 2 shown in FIG. 2, in the computing system 6 shown in FIG. 6, each computing processor 620 with a direct link may maintain a software-configurable local routing table to control transmission of data traffic.

Figure 7:
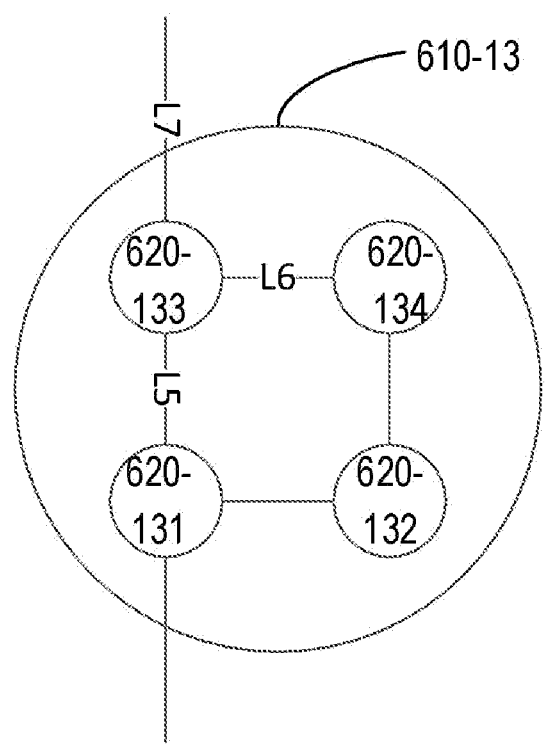
FIG. 7 is a diagram showing connection of a computing processor in a computing node shown in FIG. 6.

FIG. 7 is a diagram showing a connection relationship of a computing processor 620 in a computing node 610 shown in FIG. 6. Table 2 below shows an exemplary local routing table of the computing processor 620. It is assumed that the computing node 610 is the computing node 610-13 shown in FIG. 6, and the computing processor 620 is the computing processor 620-133 in the computing node 610-13. As shown in FIG. 6, the computing processor 620-133 is connected to other computing processors 620-131 and 620-134 in the local computing node 610-13 through direct links L5 and L6, respectively, and connected to an external node 610 (such as a computing node 610-31 in another computing cluster 60-3 shown in FIG. 6) through the direct link L7, and more specifically, connected with one computing processor 620 (such as the computing processor 620-311 in the computing node 610-31 in the computing cluster 60-3 shown in FIG. 6) in the external node 610. Here, the direct links (such as L5 and L6) connected to the computing processor 620 in the local computing node 610 are also referred to as internal direct links, and the direct links (such as L7) connected to the external computing node 610 are also referred to as outgoing direct links.

TABLE 2

Local routing table of computing processor 620-133

| Data destination | Data source | | | | |
|---|---|---|---|---|---|
| | computing processor 620-131 | computing processor 620-132 | computing processor 620-133 | computing processor 620-134 | External node |
| computing processor 620-131 | | | L5 | L5 | L5/local |
| computing processor 620-132 | | | L6 | | L6/local |
| computing processor 620-133 | local | | | local | local |
| computing processor 620-134 | L6 | | L6 | | L6/local |
| External node | L7 | | L7 | L7 | local |

It can be seen that, compared with the connection relationship diagram of the computing processor 220 shown in FIG. 3, in the connection relationship diagram of the computing processor 620-133 shown in FIG. 7, since there is no direct link between the computing processor 620-132 and the computing processor 620-133 in the local computing node 610, the computing processor 620-133 cannot directly receive data packets from the computing processor 620-132, and therefore the data source in Table 2 is that the columns for the computing processor 620-132 are all empty. In this case, in the local routing table configured for the computing processor 620-132, another computing processor (e.g., computing processor 620-131 or computing processor 620-134) may be selected as the relay processor to forward the packet to the computing processor 620-133.

On the other hand, although there is no direct link between the computing processor 620-133 and the computing processor 620-132, the local routing table of the computing processor 620-133 may still be configured to forward data packets to the computing processor 620-132 through other direct links connected thereto. For example, as shown in Table 2, the computing processor 620-133 may first send the data packets sent to the computing processor 620-132 to the computing processor 620-134 through the direct link L6 (or the direct link L5), then the computing processor 620-134 sends the data packet to the computing processor 620-132 through the direct link between the computing processor 620-134 and the computing processor 620-132.

According to the local routing table as shown in Table 2, the computing processor 620-133 may process the received data packets differently. Here, the data processing process performed by the data processor 620-133 on the received data packets is basically the same as that described above in conjunction with FIG. 4 and FIG. 5, and will not be repeated here.

Figure 8A:
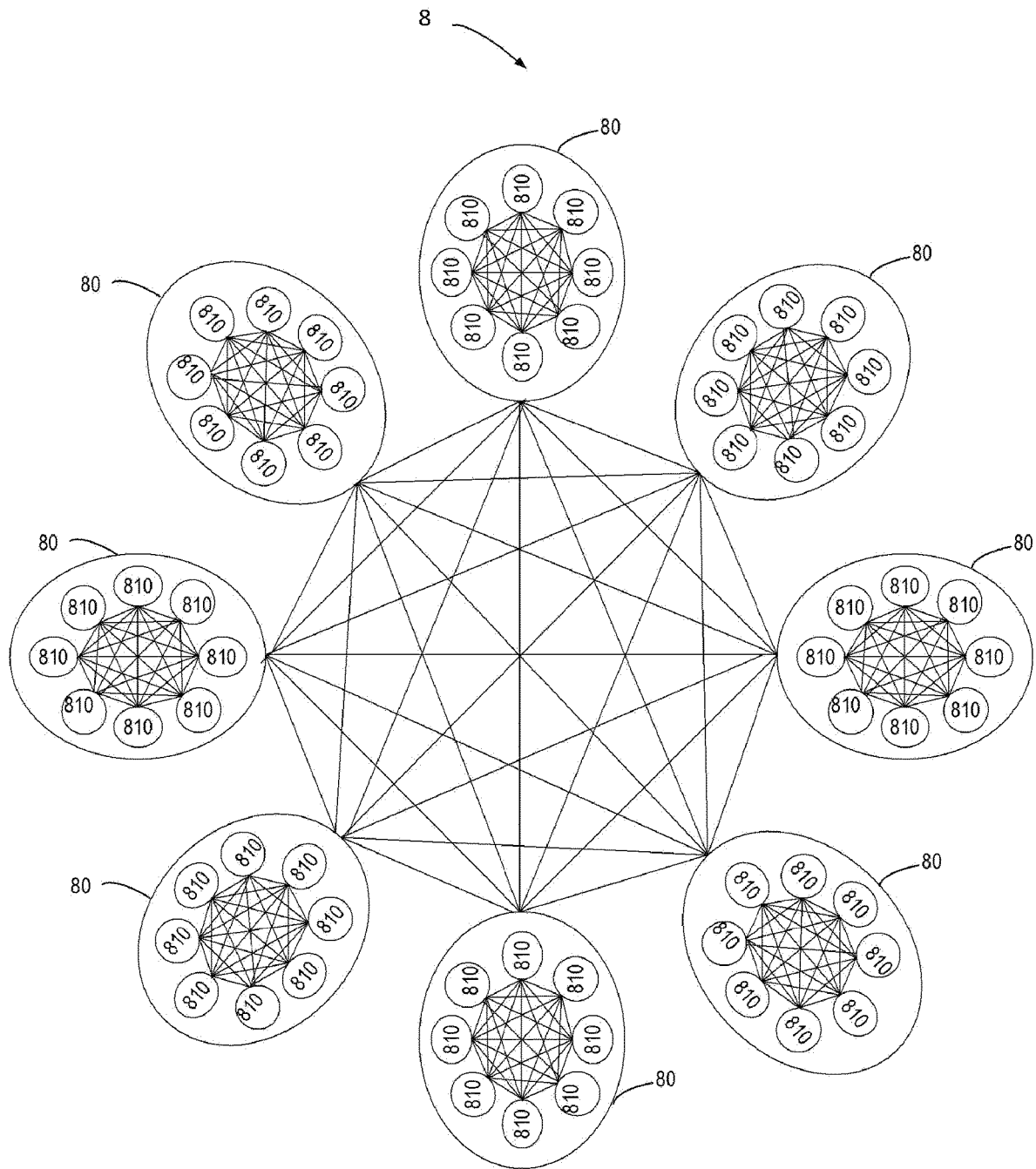
FIG. 8A and FIG. 8B are schematic views of a computing system according to yet another embodiment of the present disclosure.
Figure 8B:
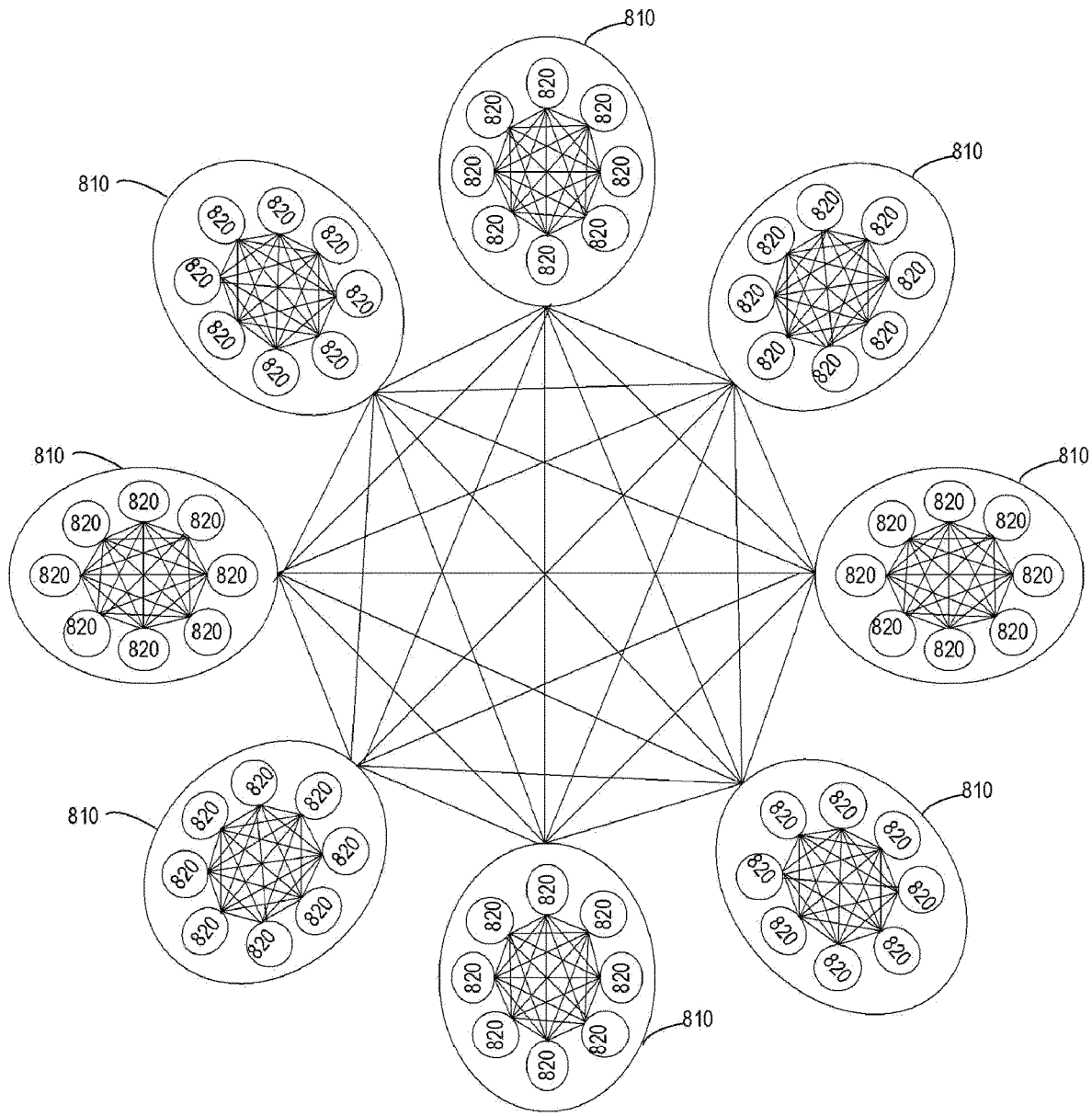

FIG. 8A and FIG. 8B are schematic views of a computing system 8 according to yet another embodiment of the present disclosure. The respective computing clusters, computing nodes, and computing processors are labeled in a manner similar to that shown in FIG. 2 and FIG. 6, and will not be repeated here.

Compared with the computing system 2 shown in FIG. 2, the computing system 8 shown in FIG. 8A and FIG. 8B includes more computing clusters 80, each computing cluster 80 includes more computing nodes 810, and each computing node 810 includes more computing processors 820. For example, the computing system 2 shown in FIG. 2 shows 4 computing clusters 20, each computing cluster 20 includes 4 computing nodes 210, and each computing node 210 includes 4 computing processors 220, while in the computing system 8 shown in FIG. 8A and FIG. 8B, 8 computing clusters 80 are shown, each computing cluster 80 includes 8 computing nodes 810, and each computing node 810 includes 8 computing processors 820.

Similar to the computing system 2 shown in FIG. 2, in the computing system 8 shown in FIG. 8A and FIG. 8B, a plurality of computing clusters 80 are interconnected in pairs, a plurality of computing nodes 810 in each computing cluster 80 are connected in pairs, and the multiple computing processors 820 in each computing node 810 are connected in pairs, so the computing system 8 shown in FIG. 8A and FIG. 8B also has a fully connected structure.

Figure 9A:
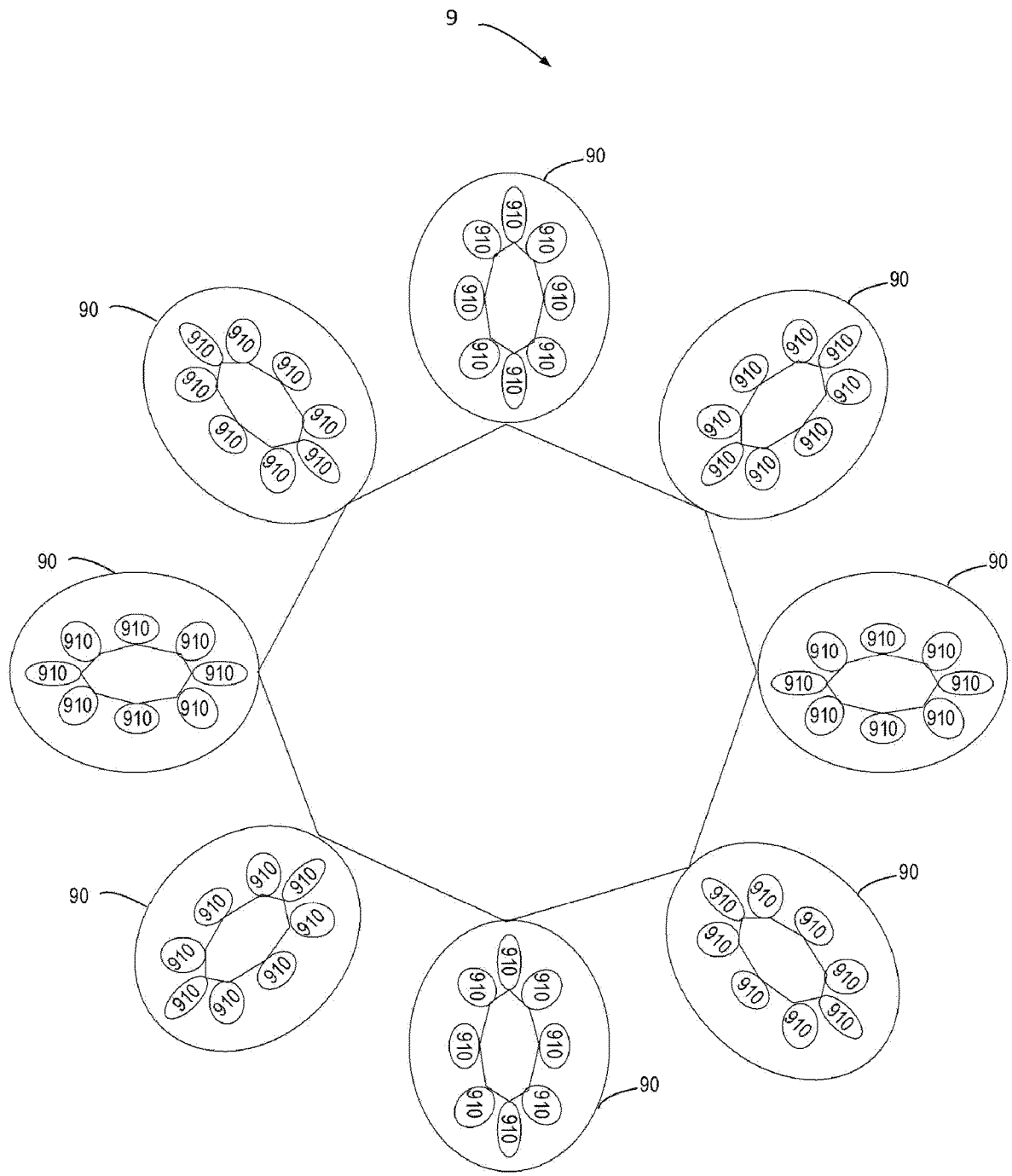
FIG. 9A and FIG. 9B are schematic views of a computing system according to still another embodiment of the present disclosure.
Figure 9B:
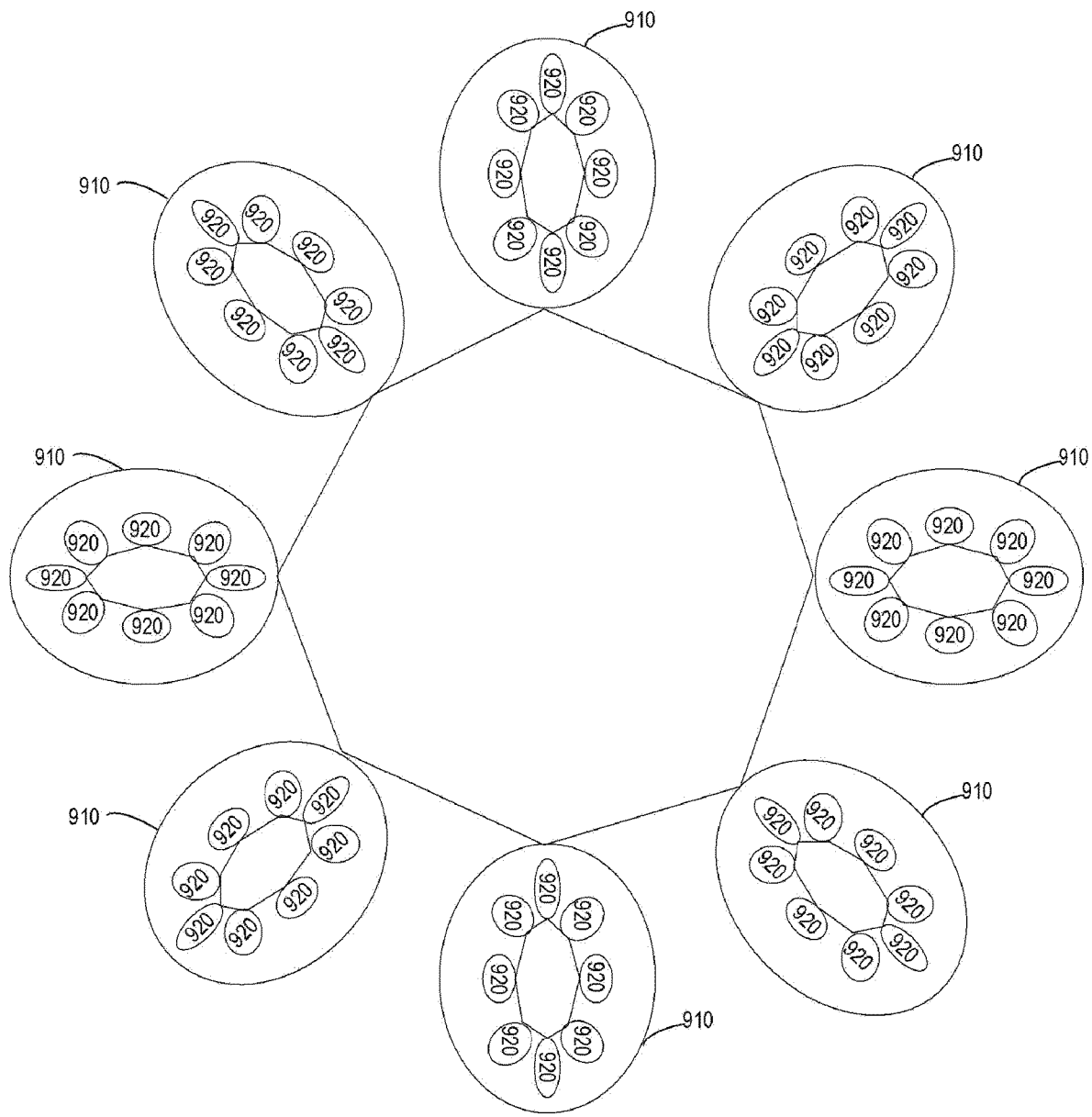

FIG. 9A and FIG. 9B are schematic views of a computing system 9 according to still another embodiment of the present disclosure. The respective computing clusters, computing nodes and computing processors are marked in a manner similar to that shown in FIG. 2, FIG. 6, and FIG. 8A and FIG. 8B, which will not be repeated here.

Compared with the computing system 6 shown in FIG. 6, the computing system 9 shown in FIG. 9A and FIG. 9B includes more computing clusters 90, each computing cluster 90 includes more computing nodes 910, and each computing node 910 includes more computing processors 920. For example, the computing system 6 shown in FIG. 6 shows 4 computing clusters 60, each computing cluster 60 includes 4 computing nodes 610, and each computing node 610 includes 4 computing processors 620, while in the computing system 9 shown in FIG. 9A and FIG. 9B, nine computing clusters 90 are shown, each computing cluster 90 includes 8 computing nodes 910, and each computing node 910 includes 8 computing processors 920.

Similar to the computing system 6 shown in FIG. 6, in the computing system 9 shown in FIG. 9A and FIG. 9B, only some computing clusters 90 of the multiple computing clusters 90 directly have direct links between them, only some computing nodes 910 of each computing cluster 90 have direct links between them, and only some computing processors 920 of each computing node 910 have direct links between them, and therefore the computing system 9 shown in FIG. 9A and FIG. 9B also has a partially connected structure.

In the computing systems shown in FIG. 8A, FIG. 8B, FIG. 9A and FIG. 9B, at each computing processor with a direct link, a software-configurable local routing table similar to Table 1 and Table 2 above is also configured based on network topology and actual application requirements. Moreover, the data processing process at each computing processor is also similar to the process described above in conjunction with FIG. 4 and FIG. 5, so the related description is not repeated here.

Various embodiments of computing systems connected through direct links and configuring local routing tables for computing processors in accordance with the present disclosure have been described above with reference to the accompanying drawings. Replacing conventional dedicated network switches and general-purpose processors with computing processing units with direct links that are cheaper and have high-performance can reduce network costs while achieving low latency and high performance. Moreover, by involving computing processors in the data flow control, the data transmission is more flexible and the application is optimized.

Furthermore, although the computing systems 2, 6, 8, and 9 are described as separate computing systems in the above figures, the computing systems 2, 6, 8, or 9 described in the present disclosure may be combined with the computing system 1 shown in FIG. 1. For example, the computing system 1 may be connected to subsystems of computing systems 2, 6, 8, or 9 that do not implement the direct link connections and local routing tables described above, or configured to support applications that require conventional communications software implementation.

In one or more exemplary designs, the functions described herein may be implemented in hardware, software, firmware, or any combination thereof. For example, if the functions are implemented in software, the functions may be stored on or transmitted over as one or more instructions or code on a computer-readable medium.

The various components of the computing systems disclosed herein may be implemented using discrete hardware components, or may be implemented integrally on one hardware component. For example, general-purpose processors, digital signal processors (DSPs), application-specific integrated circuits (ASICs), field programmable gate arrays (FPGAs) or other programmable logic devices, discrete gate or transistor logic, discrete hardware components or any combination of the functions described herein may be adopted to implement or execute the various exemplary logical blocks, modules, and circuits described in connection with this disclosure.

Those of ordinary skill in the art should also understand that various exemplary logical blocks, modules, circuits, and algorithm steps described in conjunction with the embodiments of the present disclosure may be implemented as electronic hardware, computer software, or a combination of the above.

The above description of the present disclosure is intended to enable any person of ordinary skill in the art to implement or use the present disclosure. Various modifications to this disclosure will be readily apparent to those skilled in the art, and the generic principles defined herein may be applied to other modifications without departing from the spirit and scope of this disclosure. Thus, the present disclosure is not intended to be limited to the examples and designs described herein but is to be accorded the widest scope consistent with the principles and novel features disclosed herein.

What is claimed is:

1. A computing system, comprising:
    a plurality of computing clusters, wherein each of the computing clusters comprises a plurality of computing nodes, and each of the computing nodes comprises a plurality of computing processors,
    wherein at least some of the plurality of computing clusters, at least some computing nodes of each of the computing clusters and at least some computing processors of each of the computing nodes are connected through a direct link;
    wherein each of the computing processors of the at least some computing processors of the computing nodes is configured with a local routing table for the computing processor to determine, based on the local routing table, a next direct link through which a data packet performs routing from a data source to a data destination, and the computing processor forwards the data packet through the next direct link,
    wherein the computing processor is configured to perform the following:
    receiving the data packet;
    determining whether the data destination of the data packet is a computing processor in a local computing node where the computing processor is located or a computing processor in an external computing node;
    wherein if it is determined that the data destination of the data packet is the computing processor in the local computing node, it is determined whether the data destination of the data packet is the computing processor itself or another computing processor in the local computing node;
    if it is determined that the data destination of the data packet is the another computing processor in the local computing node, the next direct link of the data packet is determined, based on the local routing table, to be an internal direct link from the computing processor to the another computing processor;
    if it is determined that the data destination of the data packet is the computing processor in the external computing node, it is determined that the next direct link of the data packet is an outgoing direct link of the computing processor; and
    if it is determined that the data destination of the data packet is the computing processor itself, the data packet is directly subjected to local processing.

2. The computing system according to claim 1, wherein the data source comprises the computing processor itself, another computing processor in a local computing node where the computing processor is located, or an external computing node of the local computing node, the data destination comprises the computing processor itself, the another computing processor in the local computing node, or the external computing node of the local computing node.

3. The computing system according to claim 1, wherein the computing processor is configured to perform the following:
    receiving the data packet;
    determining whether the data source of the data packet is a computing processor in a local computing node where the computing processor is located or a computing processor in an external computing node;
    wherein if it is determined that the data source of the data packet is the computing processor in the external computing node, it is determined whether the data packet specifies the data destination or a relay computing processor in the local computing node;
    if it is determined that the data packet specifies the data destination or the relay computing processor in the local computing node, the next direct link of the data packet is determined to be a direct link between the computing processor and the data destination or the relay computing processor;
    if it is determined that the data packet does not specify the data destination or the relay computing processor in the local computing node, the next direct link of the data packet is determined based on an application program executed by the computing processor;
    if it is determined that the data source of the data packet is the computing processor in the local computing node, it is determined whether the data destination of the data packet is the computing processor itself or another computing processor in the local computing node;
    if it is determined that the data destination of the data packet is the another computing processor in the local computing node, the next direct link of the data packet is determined to be an outgoing direct link or an internal direct link based on the local routing table; and
    if it is determined that the data destination of the data packet is the computing processor itself, the data packet is directly subjected to local processing.

4. The computing system according to claim 1, wherein the computing system has a fully connected structure, and any two of the computing clusters in the plurality of computing clusters, any two of the computing nodes in each of the computing clusters, and any two of the computing processors in each of the computing nodes are connected through the direct link, and each of the computing processors is connected to a computing processor in another computing node in the same computing cluster or a different computing cluster through an outgoing direct link.

5. The computing system according to claim 1, further comprising:
    a routing compiler, which is configured to compile and generate the local routing table for the computing processor according to a connection relationship and application requirements of the direct link of each of the computing processors in the computing system.

6. A computing processor, connected to at least one another computing processor in a local computing node through a direct link,
  wherein the computing processor is configured with a local routing table, the computing processor is configured to determine, based on the local routing table, a next direct link through which a data packet performs routing from a data source to a data destination, and the computing processor forwards the data packet through the next direct link,
  wherein the computing processor is configured to perform the following:
  receiving the data packet;
  determining whether the data destination of the data packet is the computing processor in the local computing node or a computing processor in an external computing node;
  wherein if it is determined that the data destination of the data packet is the computing processor in the local computing node, it is determined whether the data destination of the data packet is the computing processor itself or the another computing processor in the local computing node;
  if it is determined that the data destination of the data packet is the another computing processor in the local computing node, the next direct link of the data packet is determined, based on the local routing table, to be an internal direct link from the computing processor to the another computing processor;
  if it is determined that the data destination of the data packet is the computing processor in the external computing node, it is determined that the next direct link of the data packet is an outgoing direct link of the computing processor; and
  if it is determined that the data destination of the data packet is the computing processor itself, the data packet is directly subjected to local processing.

7. The computing processor according to claim 6, wherein the data source comprises the computing processor itself, the another computing processor in the local computing node, or an external computing node of the local computing node, and the data destination comprises the computing processor itself, the another computing processor in the local computing node, or the external computing node of the local computing node.

8. The computing processor according to claim 6, wherein the computing processor is configured to perform the following:
  receiving the data packet;
  determining whether the data source of the data packet is the computing processor in the local computing node or a computing processor in an external computing node;
  wherein if it is determined that the data source of the data packet is the computing processor in the external computing node, it is determined whether the data packet specifies the data destination or a relay computing processor in the local computing node;
  if it is determined that the data packet specifies the data destination or the relay computing processor in the local computing node, the next direct link of the data packet is determined to be a direct link between the computing processor and the data destination or the relay computing processor;
  if it is determined that the data packet does not specify the data destination or the relay computing processor in the local computing node, the next direct link of the data packet is determined based on an application program executed by the computing processor;
  if it is determined that the data source of the data packet is the computing processor in the local computing node, it is determined whether the data destination of the data packet is the computing processor itself or the another computing processor in the local computing node;
  if it is determined that the data destination of the data packet is the another computing processor in the local computing node, the next direct link of the data packet is determined to be an outgoing direct link or an internal direct link based on the local routing table; and
  if it is determined that the data destination of the data packet is the computing processor itself, the data packet is directly subjected to local processing.

9. A data processing method for a computing processor, wherein the computing processor is connected to at least one another computing processor in a local computing node where the computing processor is located through a direct link and is configured with a local routing table, and the method comprising:
  receiving a data packet;
  determining whether a data destination of the data packet is a computing processor in the local computing node or a computing processor in an external computing node;
  wherein if it is determined that the data destination of the data packet is the computing processor in the local computing node, it is determined whether the data destination of the data packet is the computing processor itself or the another computing processor in the local computing node;
  if it is determined that the data destination of the data packet is the another computing processor in the local computing node, a next direct link of the data packet is determined, based on the local routing table, to be an internal direct link from the computing processor to the at least one another computing processor;
  if it is determined that the data destination of the data packet is the computing processor in the external computing node, it is determined that the next direct link of the data packet is an outgoing direct link of the computing processor;
  the data packet is forwarded through the next direct link; and
  if it is determined that the data destination of the data packet is the computing processor itself, the data packet is directly subjected to local processing.

10. A data processing method for a computing processor, wherein the computing processor is connected to at least one another computing processor in a local computing node where the computing processor is located through a direct link and is configured with a local routing table, and the method comprising:
  receiving a data packet;
  determining whether a data source of the data packet is the computing processor in the local computing node or a computing processor in an external computing node;
  wherein if it is determined that the data source of the data packet is the computing processor in the external computing node, it is determined whether the data packet specifies a data destination or a relay computing processor in the local computing node;
  if it is determined that the data packet specifies the data destination or the relay computing processor in the local computing node, a next direct link of the data packet is determined to be a direct link between the computing processor and the data destination or the relay computing processor;

if it is determined that the data packet does not specify the data destination or the relay computing processor in the local computing node, the next direct link of the data packet is determined based on an application program executed by the computing processor;

if it is determined that the data source of the data packet is the computing processor in the local computing node, it is determined whether the data destination of the data packet is the computing processor itself or the another computing processor in the local computing node;

if it is determined that the data destination of the data packet is the another computing processor in the local computing node, the next direct link of the data packet is determined to be an outgoing direct link or an internal direct link based on the local routing table;

the data packet is forwarded through the next direct link; and if it is determined that the data destination of the data packet is the computing processor itself, the data packet is directly subjected to local processing.

* * * * *